(12) United States Patent
Green

(10) Patent No.: US 10,196,794 B2
(45) Date of Patent: *Feb. 5, 2019

(54) ADJUSTABLE GUIDED RAKE APPARATUS AND METHOD

(71) Applicant: Darren Green, Ontario (CA)

(72) Inventor: Darren Green, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/959,886

(22) Filed: Apr. 23, 2018

(65) Prior Publication Data

US 2018/0238014 A1 Aug. 23, 2018

Related U.S. Application Data

(63) Continuation-in-part of application No. 15/240,467, filed on Aug. 18, 2016, now Pat. No. 9,949,429.

(30) Foreign Application Priority Data

Aug. 31, 2015 (CA) ...................................... 2902077

(51) Int. Cl.
| | |
|---|---|
| *A01D 7/00* | (2006.01) |
| *E02F 3/02* | (2006.01) |
| *E01C 19/15* | (2006.01) |
| *A01B 1/06* | (2006.01) |
| *A01D 7/04* | (2006.01) |

(52) U.S. Cl.
CPC .................. *E02F 3/02* (2013.01); *A01B 1/06* (2013.01); *A01D 7/04* (2013.01); *E01C 19/15* (2013.01)

(58) Field of Classification Search
CPC .. A01B 1/12; A01B 1/22; A01B 1/222; A01B 1/024; A01B 1/06; A01B 1/08; A01B 1/10; A01D 7/02; E01C 19/15; E02F 3/02

USPC ............... 56/400.01, 400.05, 400.09; 37/270
See application file for complete search history.

(56) References Cited

U.S. PATENT DOCUMENTS

| | | |
|---|---|---|
| 210,650 A | 12/1878 | Weichhart |
| 293,210 A | 2/1884 | Dennen et al. |
| 645,702 A | 3/1900 | Arlaud |
| 718,571 A | 1/1903 | Hoodless |
| 719,723 A | 2/1903 | Beebe |
| 743,981 A | 11/1903 | Hagen |
| 750,856 A | 2/1904 | Houghland |
| 958,188 A | 5/1910 | Severson |
| 1,356,972 A | 10/1920 | Crisman |
| 1,372,558 A | 3/1921 | Saxl |
| 1,414,087 A | 4/1922 | Kenny |
| 2,033,451 A | 3/1936 | Rose |
| 2,152,377 A | 3/1939 | Friedheim |
| 2,495,947 A | 1/1950 | Smith |

(Continued)

FOREIGN PATENT DOCUMENTS

CH 335891 A 1/1959

*Primary Examiner* — Thomas B Will
*Assistant Examiner* — Joan D Misa
(74) *Attorney, Agent, or Firm* — Saliwanchik, Lloyd & Eisenschenk

(57) ABSTRACT

An adjustable guided rake apparatus and method, which enable an adjustable guided rake user to configure an adjustable rake guide to a specified height in relation to a secondary surface, which will then define the height of the grading edge of the grading rake head in relation to a primary surface. The adjustable guided rake user is able to move the grading rake head along a primary surface, in order to shift material along the surface, while the adjustable rake guide runs along the secondary surface, guiding the grading rake head.

11 Claims, 6 Drawing Sheets

(56) References Cited

U.S. PATENT DOCUMENTS

| | | |
|---|---|---|
| 2,790,297 A | 4/1957 | Gardner |
| 2,795,923 A | 6/1957 | Kapuczin |
| 3,053,311 A | 9/1962 | Nottage |
| 3,374,614 A | 3/1968 | Dacheux |
| 3,495,388 A | 2/1970 | Anesi |
| 3,678,670 A | 7/1972 | Welz |
| 4,073,076 A | 2/1978 | Fortune |
| 4,219,994 A | 9/1980 | Ciscon |
| D372,406 S | 8/1996 | Scarvaglione |
| 5,671,553 A | 9/1997 | Burkhart |
| 6,073,702 A | 6/2000 | Petruzzelli |
| 2007/0130903 A1 | 6/2007 | Sunde |
| 2011/0067375 A1 | 3/2011 | Madaffer |
| 2012/0111586 A1 | 5/2012 | Kimball |
| 2012/0137548 A1 | 6/2012 | Kimball |

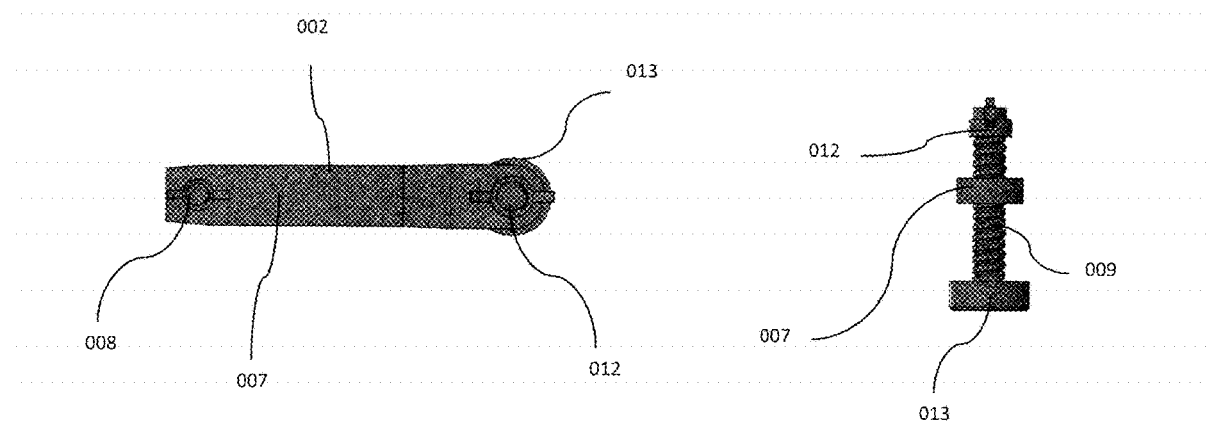
FIG. 5A
FIG. 5B
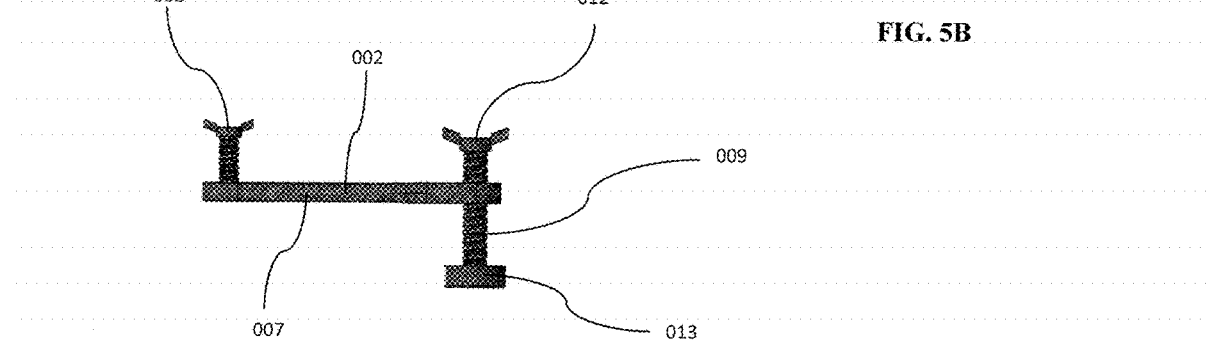
FIG. 5C

ADJUSTABLE GUIDED RAKE APPARATUS AND METHOD

CROSS-REFERENCE TO RELATED APPLICATIONS

This application is a continuation-in-part (CIP) application of U.S. patent application Ser. No. 15/240,467, filed Aug. 18, 2016, which claims priority to Canadian Patent Application No. 2,902,077, filed Aug. 31, 2015, both of which are incorporated herein by reference in their entireties, including any figures, tables, and drawings.

FIELD OF THE INVENTION

The present invention pertains to the field of rakes and in particular to grading rakes.

BACKGROUND

The use of a rake to grade a surface is well known within the construction and other labor industries and has been practiced for many years. Laborers of all description employ a grading rake to spread some kind of material evenly over a surface. Grading rakes provide an easy and quick means of spreading material, such as a substrate.

Typically, a grading rake user pushes and pulls the rake head over a substrate, using a handle that is attached to the rake, to manipulate the substrate. There are many reasons to manipulate the substrate, for example a user may wish to level the substrate to a desired level. The leveling of a substrate can be important for structural and aesthetic reasons.

Although grading rakes allow a user to manipulate substrate, there remain issues. Presently, a grading rake user hoping to level a substrate must rely on their judgment to ensure the accuracy of the level. There are other means of checking substrate level, but these means are often complex and costly, and can take a lot of time to implement.

A grading rake user can manipulate substrate on a primary surface; however this manipulation is without reference to a secondary surface. This prevents a grading rake user from manipulating substrate as may be required along secondary surfaces of different material, height and other characteristics.

Grading rakes are fixed tools incapable of user manipulation. Often several different rakes may be required for different grading situations, or substrate manipulation. It is expensive and cumbersome to purchase and transport multiple grading rakes to job sites.

There have been grading rakes disclosed in the past as described in the US patents with publication numbers U.S. Pat. No. 2,152,377-A, U.S. Pat. No. 3,678,670-A, U.S. Pat. No. 4,219,994-A and U.S. Pat. No. 5,671,553. Although these grading rakes provide some type a guiding feature to affect substrate raking, the guiding capabilities are limited.

Therefore there is a need for an adjustable guided rake apparatus that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF INVENTION

An object of the present invention is to provide an adjustable guided rake apparatus and method. In accordance with an aspect of the present invention, there is provided an adjustable guided rake apparatus for grading a material on a primary surface to a user specified standard relative to a secondary surface, the apparatus comprising a grading rake head comprising an elongate blade having a top edge and a bottom grading edge; a guide track mounted on the top edge of the elongate blade; at least one adjustable rake guide slidably mounted within the guide track; and wherein each adjustable rake guide comprises a guide arm in sliding communication with the guide track, at least one fastener for securing the guide arm within the guide track, and at least one height adjuster for adjusting the height of the bottom grading edge relative to the secondary surface attached to the guide arm.

In accordance with another aspect of the present invention, there is provided a method of grading material of a primary surface to a user specified standard using an adjustable guided rake, the method comprising the steps of adjusting the at least one adjustable rake guide to a specified height in relation to the secondary surface; adjusting the at least one adjustable rake guide to a specified standard within the guide track; and passing the grading edge of the rake head of the adjustable guided rake apparatus over the primary surface until the specified standard is achieved.

BRIEF DESCRIPTION OF THE FIGURES

Embodiments of the present invention will be better understood in connection with the following Figures, in which:

FIGS. 5A-5C illustrate multiple views of components of the adjustable rake guide.

DETAILED DESCRIPTION

Definitions

Figure 1:
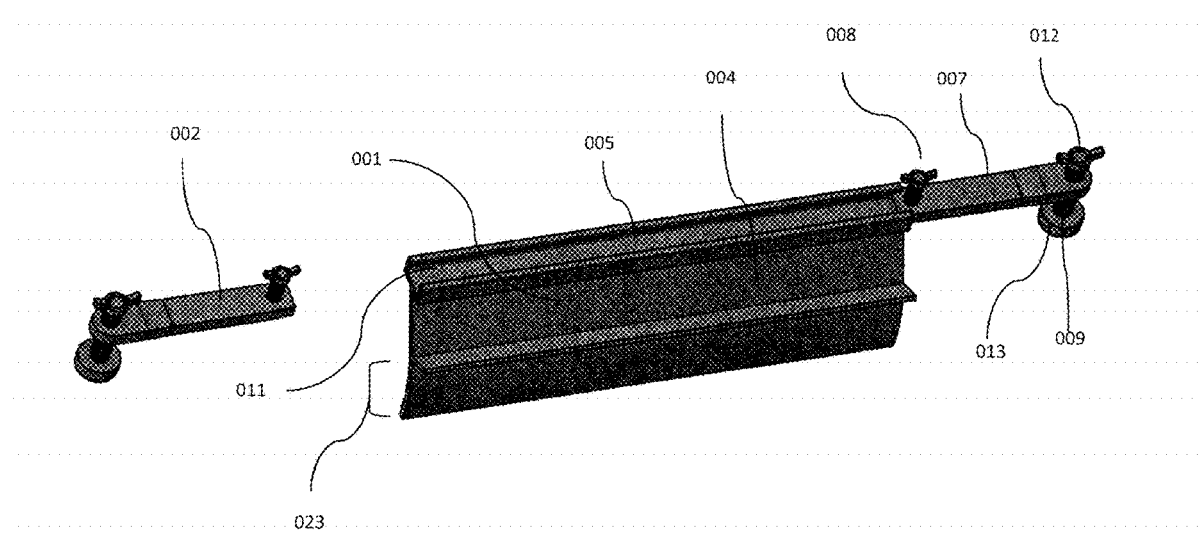
FIG. 1 illustrates a perspective view of the adjustable guided rake head.

The term "adjustable guided rake", hereinafter also referred to as the "AGR" is used to define the adjustable guided rake apparatus.

Unless defined otherwise, all technical and scientific terms used herein have the same meaning as commonly understood by one of ordinary skill in the art to which this invention belongs.

Apparatus and Method Overview

The present invention provides an apparatus which enables a user to adjust a rake guide to a specified standard of their choice. It further provides an adjustable guided rake which can level material on a primary surface next to a secondary surface without requiring user judgment. The rake allows for manipulation of material upon a primary surface in reference to a secondary surface. The adjustable grading rake is inexpensive, versatile, simple to use and saves time and effort that is required during the use of a traditional grading rake.

The present invention also provides a method of using the adjustable guided rake apparatus.

In one embodiment, it is contemplated that the AGR and method may be used on many surfaces, including but not limited to substrate, soil, grass, concrete, cement, sand, gravel, dirt, tiles, stone, ceramic, glass, metal, wood, composite materials, marble, granite, slate, acrylic, and any other surface as would be appreciated by the skilled person. In another embodiment, it is further contemplated that the AGR and method may manipulate many materials, including but not limited to soil, stone, gravel, sand, cement, concrete, substrate, dirt, wood, filler, and any other material as would be appreciated by the skilled person.

In another embodiment, it is contemplated that a primary surface may be made up of any of the surfaces, or a combination of surfaces as described herein. In another embodiment, it is contemplated that a secondary surface may be made up of any of the surfaces, or a combination of surfaces as described herein.

In another embodiment, it is contemplated that the material manipulated by the AGR and method may be made up of any of the material, or a combination of material as described herein.

As will be readily appreciated by the skilled person, all components of the AGR discussed herein can be formed of any suitable material and by any suitable manufacturing process.

In one embodiment, the AGR is comprised of an adjustable rake guide, and a grading rake head.

In one embodiment, the grading rake head is comprised of an elongate blade having a top edge and a bottom grading edge, and a guide track.

In another embodiment, it is contemplated that the elongate blade may be of any length, shape, width and thicknesses to accommodate the needs of the AGR user. Said elongate blade may be, but is not limited to, rectangular, half-circle, elliptical, quadrilateral, triangular, or diamond in shape.

In one embodiment, it is contemplated that the elongate blade may be curved along the blade. The curve will run the entire length of the elongate blade and will bend away from the elongate blade spine that runs lengthwise along the middle of the grading rake head. The curve will be rounded and will begin at the point of the elongate blade spine.

In another embodiment, it is contemplated that there may be single or multiple elongate blade curves. The elongate blade curve may run partial lengths along the elongate blade, and may bend at any angle or direction as would be understood by someone skilled in the art. The elongate blade curve may be sharp, gradual, or otherwise as would be understood by someone skilled in the art, and may run lengthwise or horizontally along the elongate blade. The elongate blade curve may start in the middle, top, or bottom portion of the grading rake head as would be understood by someone skilled in the art. It may start at the same point or a different point to that of the elongate blade spine.

In one embodiment, it is contemplated that the guide track may run in multiple sections and not in a single piece; it may also run less than the entirety of the length of the grading rake head.

In another embodiment, it is contemplated that the guide track accommodates an adjustable rake guide. Said accommodation may include the ability to manipulate the adjustable rake guide within the guide track; in this way the AGR provides at least two forms of rake adjustment. Said manipulation of the adjustment rake guide may include, but is not limited to adjustment means such as sliding, clipping, fastening, ratcheting or another adjustment means as would be appreciated by the skilled person.

In another embodiment, it is contemplated that the guide track may be mounted on the top edge of the grading rake head. The guide track may be mounted to the top edge of the grading rake head using an attachment means such as but not limited to extrusion, fastening, welding, gluing, screwing, nailing, or other attachment means as would be appreciated by a skilled person.

In another embodiment, it is contemplated that the guide track may be mounted on the grading rake head. The guide track may be mounted to the grading rake head using an attachment means such as but not limited to extrusion, fastening, welding, gluing, screwing, nailing, or other attachment means as would be appreciated by a skilled person.

In one embodiment, it is contemplated that the guide track is a roughly rectangular component, which accommodates a sectional cut-out on one of the length sides of the rectangle, to form a cross section that resembles a "c" of five sides, each "c" side at 90 degree angles to each connected side, with thickness suited to accommodate an adjustable rake guide, which may extend along and run in parallel to the grading rake head, and may span the same length of the entirety of the grading rake head.

In one embodiment, it is contemplated that the guide track may be mounted to the top edge of the grading rake head, wherein the non-cutout length of the rectangle portion of the guide track is mounted to the top edge of the grading rake head perpendicular to the grading rake head.

In another embodiment, it is contemplated that the guide track may be mounted to the top edge of the grading rake head, wherein the non-cutout length of the rectangle portion of the guide track is mounted to the top edge of the grading rake head at an acute angle in relation to the side of the grading rake head that the AGR user is situated.

In another embodiment, it is contemplated that the guide track may be mounted to the top edge of the grading rake head, wherein the non-cutout length of the rectangle portion of the guide track is mounted to the top edge of the grading rake head at an acute angle in relation to the side of the grading rake head that the AGR user is situated.

In one embodiment, it is contemplated that the bottom grading edge of the elongate blade will be a straight edge.

In one embodiment, it is contemplated that the bottom grading edge of the elongate blade may accommodate a plurality of blade teeth. Said blade teeth may be, but are not limited to rectangular, square, quadrilateral, triangular, circular, or another shape as would be appreciated by the skilled person. Said blade teeth may run in parallel and along the entirety of the bottom grading edge of the elongate blade.

In another embodiment, it is contemplated that the blade teeth may run in multiple sections along the bottom edge of the elongate blade, and are attached using an attachment means such as but not limited to extrusion, fastener, welding, glue, screw, nail, or other attachment means as would be appreciated by a skilled person. Said blade teeth may be adjustable or removable by the AGR user to accommodate the user's specific needs.

In another embodiment, it is contemplated that that the ability to remove and exchange blade teeth will provide the AGR user with a more cost efficient and more time efficient means of using a grading rake. The AGR user will be able to adjust one rake for many different purposes, instead of having to purchase and transport several different rakes.

In another embodiment, it is contemplated that the bottom edge of the elongate blade will interact with material on a primary surface.

In one embodiment, it is contemplated that a single or multiple adjustable rake guides may be mounted on the grading rake head. It is further contemplated that one or multiple adjustable rake guides may interact with a secondary surface.

In one embodiment, it is contemplated that an adjustable rake guide may be mounted in a fixed position, or the AGR user may manually change the position of the adjustable rake guide. The AGR user is provided with multiple ways to adjust the rake, by using both the adjustable rake guide and/or moving the adjustable rake guide within the guide track. In another embodiment, it is contemplated that adjustable rake guide will be completely removable by the AGR user.

In another embodiment, it is contemplated that the ability for an AGR user to manually change the position of the adjustable rake guide will provide the AGR user with a more cost efficient and more time efficient means of using a grading rake.

In another embodiment, it is contemplated that an AGR user may adjust the rake guide to a position suitable to grade material on a primary surface to a specified standard (said specified standard may be determined relative to the height of a secondary surface).

In another embodiment, it is contemplated that an adjustable rake guide may be automatically adjusted. For example, the adjustable rake guide may be digitally set and will automatically adjust to adhere to the digital setting. The adjustable rake guide may be automatically manipulated in some other way as would be appreciated by a skilled person.

In another embodiment, it is contemplated that once an AGR user has adjusted the rake guide to a specified position, the user will not be required to make an assessment of the surrounding environment in order to meet that specified standard, their judgment is not required to grade the material on a primary surface to the specified standard as they may rely on the adjustable rake guide to direct said grading.

In another embodiment, it is contemplated that an AGR user specified standard for an adjustable rake guide may be, but is not limited to surface relative height, surface relative width, surface relative length, surface material characteristics, or another specified standard as would be appreciated by the skilled person.

In another embodiment, it is contemplated that the adjustable rake guide is comprised of a guide arm, a fastener, and a height adjuster.

In one embodiment, it is contemplated that the guide arm may be in sliding communication with the guide track. Said guide arm may be rectangular in shape, which may have width, length, and thickness dimensions suited to fit within the confines of a guide track.

In another embodiment, it is contemplated that a guide arm may be, but is not limited to interactive means with the guide track such as ratchet, notch, clip-in, or another form of interactive means as would be appreciated by the skilled person.

In another embodiment, it is contemplated that the guide arm is adapted to fit within the guide track, and may be, but is not limited to square, triangular, round, quadrilateral, cube, rod, prism, or another shape as would be appreciated by the skilled person.

In another embodiment, it is contemplated that a guide arm may be assisted by an aid that is affixed to the guide arm such as, but not limited to bearings, lubricant, coating, or another aid as would be appreciated by a skilled person, for the purposes of assisting the movement of the guide arm within the guide track.

In one embodiment, it is contemplated that a fastener may be used by an AGR user to secure a guide arm within a guide track. Said fastener may be used once the adjustable rake guide has been adjusted to an AGR user specified standard. The AGR user may unsecure and re-secure the guide arm within the guide track using the fastener as many times as the user wishes to readjust the adjustable rake guide to a specified standard.

In another embodiment, it is contemplated that an AGR user will secure a guide arm within a guide track using a wing screw fastener.

In another embodiment, it is contemplated that an AGR user will secure a guide arm within a guide track using a fastener that may be, but is not limited to screw, twist, nail, clip-in, ratchet, plug, tooth, lock, spring, or another fastening means as would be appreciated by the skilled person.

In one embodiment, it is contemplated that a height adjuster may adjust the height of the bottom grading edge relative to a secondary surface.

In another embodiment, it is contemplated that the height adjuster may adjust another characteristic of the AGR such as, but not limited to the height of a secondary surface relative to the bottom grading edge, the adjustable rake guide relative to a primary surface and vice versa, the adjustable rake guide relative to a secondary surface and vice versa, the adjustable rake guide relative to the bottom grading edge, the adjustable rake guide relative to the grading rake head and vice versa, the adjustable rake guide relative to the handle and vice versa, or another characteristic of the AGR as would be appreciated by a skilled person.

In one embodiment, it is contemplated that the height adjuster comprises a height adjuster control and a disk.

In another embodiment, it is contemplated that the height adjuster may comprise additional components to a height adjuster and a disk for the purposes of permitting the height adjuster to perform additional functions. For example, the height adjuster may also comprise a stopper in order to limit the variance available to the height adjuster, or some other additional component as would be appreciated by the skilled person.

In one embodiment, it is contemplated that a height adjuster control will raise and lower the height adjuster. Said height adjuster control may be manipulated by an AGR user. Said height adjuster control may be a wing nut acting as a locking nut on a screw.

In another embodiment, it is contemplated that a height adjuster control may be another control means such, as but not limited to screw, twist, nail, clip-in, ratchet, plug, tooth, lock, spring, or another control means as would be appreciated by the skilled person.

In another embodiment, it is contemplated that the height adjuster control may be automatically manipulated. For example, the height adjuster control may be digitally set and will automatically adjust to adhere to the digital setting. The height adjuster control may be automatically manipulated in some other way as would be appreciated by a skilled person.

In one embodiment, it is contemplated that a disk is configured to guide a height adjuster along a secondary surface.

In another embodiment, it is contemplated that a disk may be removable and replaceable. Said disk may be replaced by another disk suitable to the specific needs of an AGR user.

In another embodiment, it is contemplated that the ability to remove and exchange a disk will provide the AGR user with a more cost efficient and more time efficient means of using a grading rake.

In another embodiment, it is contemplated that a disk may be of numerous sizes and various shapes, suitable to the specific needs of an AGR user.

In another embodiment, it is contemplated that a disk may be assisted by an aid that is affixed to the disk such as, but not limited to bearings, lubricant, coating, wheels, or another aid as would be appreciated by a skilled person, for the purposes of assisting the disk to guide a height adjuster along a secondary surface.

In another embodiment, it is contemplated that the AGR will accommodate a single or multiple handles. Said handle or handles may be used by a single AGR user, or by multiple AGR users to manipulate the AGR. Said handle or handles may be manipulated manually by an AGR user, or automatically by some other automatic means as would be readily appreciated by the skilled person. Said handle or handles may have means of removal for the purposes of altering the number or type of handle or handles used for the AGR. The means of removal may be, but is not limited to screw, clip-in, twist, slide, and other mechanisms as would be appreciated by a skilled person.

In another embodiment, it is contemplated that the ability to remove and/or exchange a handle for another type of handle will provide the AGR user with a more cost efficient and more time efficient means of using a grading rake. The AGR user will be able to adjust one rake for many different purposes, instead of having to purchase and transport several different rakes. They may use the AGR with or without a handle.

In one embodiment, it is contemplated that an elongate blade spine may run in parallel and along the middle of the grading rake head, and will protrude slightly from the grading rake head at a 90 degree angle, to span the same length of the entirety of the grading rake head.

In another embodiment, it is contemplated that the elongate blade spine may run along the grading rake head in sections and not as a single piece; it may also run less than the entirety of the length of the grading rake head; it may also be fixed in place with a single or multiple assembly fasteners, or it may be incorporated into the grading rake head by some other attachment means such as but not limited to extrusion, fastener, welding, glue, screw, nail, or other attachment means as would be appreciated by a skilled person.

In another embodiment, it is contemplated that the elongate blade spine will act as gripping portion for an AGR user. The AGR user will grasp the grading rake head directly with their hand, and use the elongate blade spine as a point whereby they are able to further secure the ARG. The AGR user may then manipulate the AGR as desired while directly grasping the grading rake head.

In one embodiment, it is contemplated that material may be graded on a primary surface to an AGR user specified standard, by adjusting an adjustable rake guide to a specified height in relation to a secondary surface, and then passing the grading edge of the rake head over a primary surface until a specified standard is achieved.

Example

Figure 2:
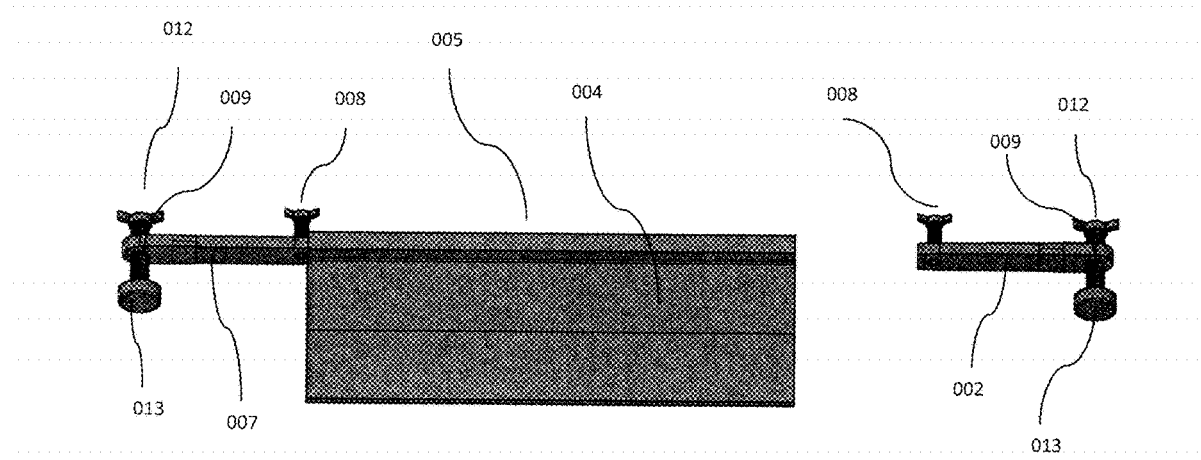
FIG. 2 illustrates an end view of the grading rake head and adjustable rake guides.
Figure 3:
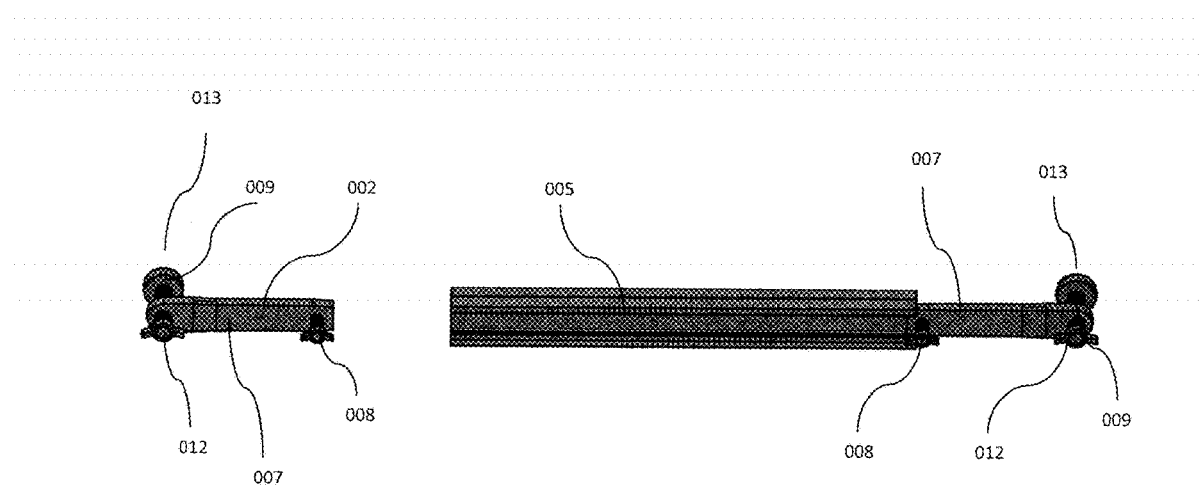
FIG. 3 illustrates a top view of a portion of the adjustable guided rake.
Figure 4:
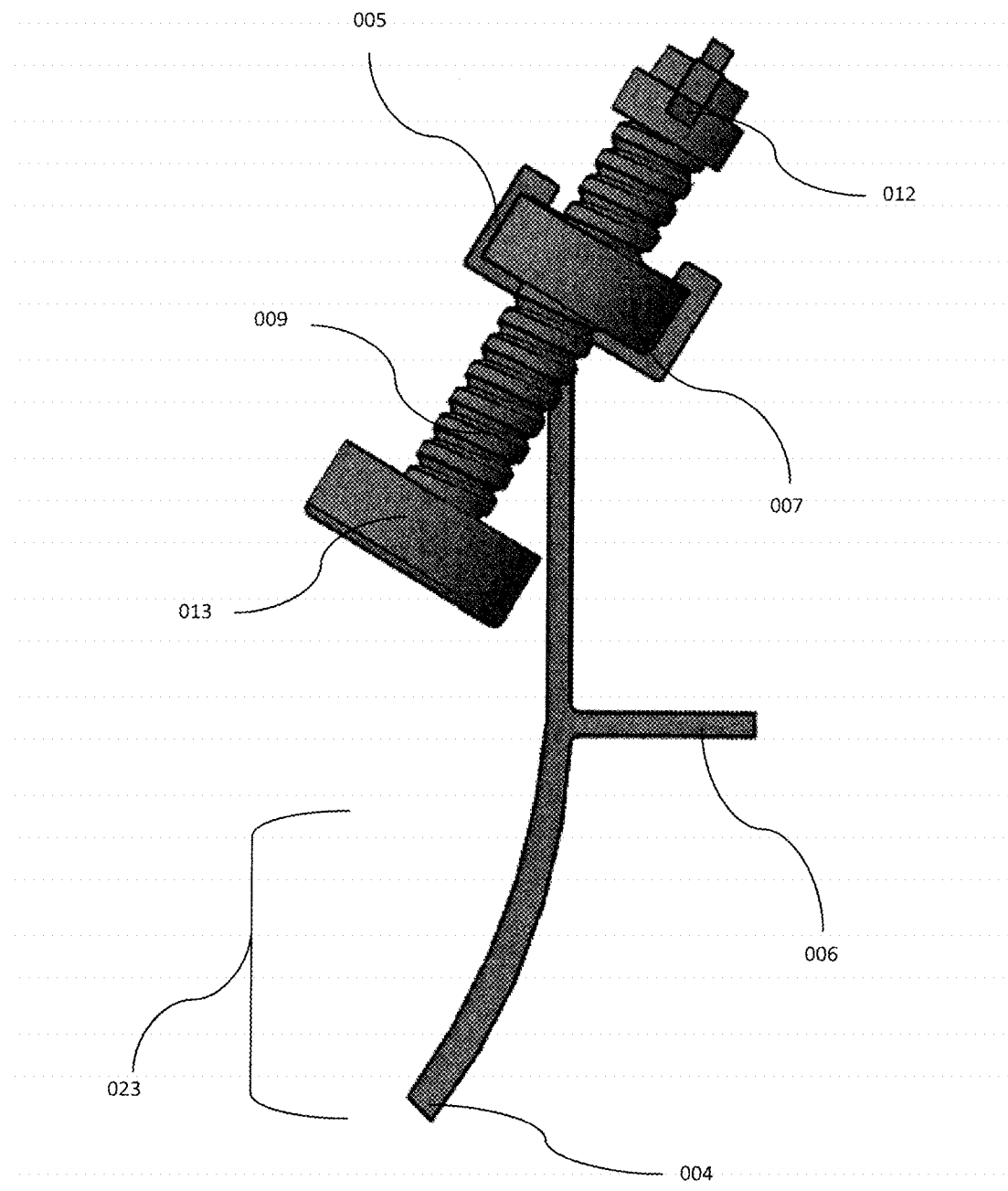
FIG. 4 illustrates a side view of a portion of the adjustable guided rake.
Figure 6:
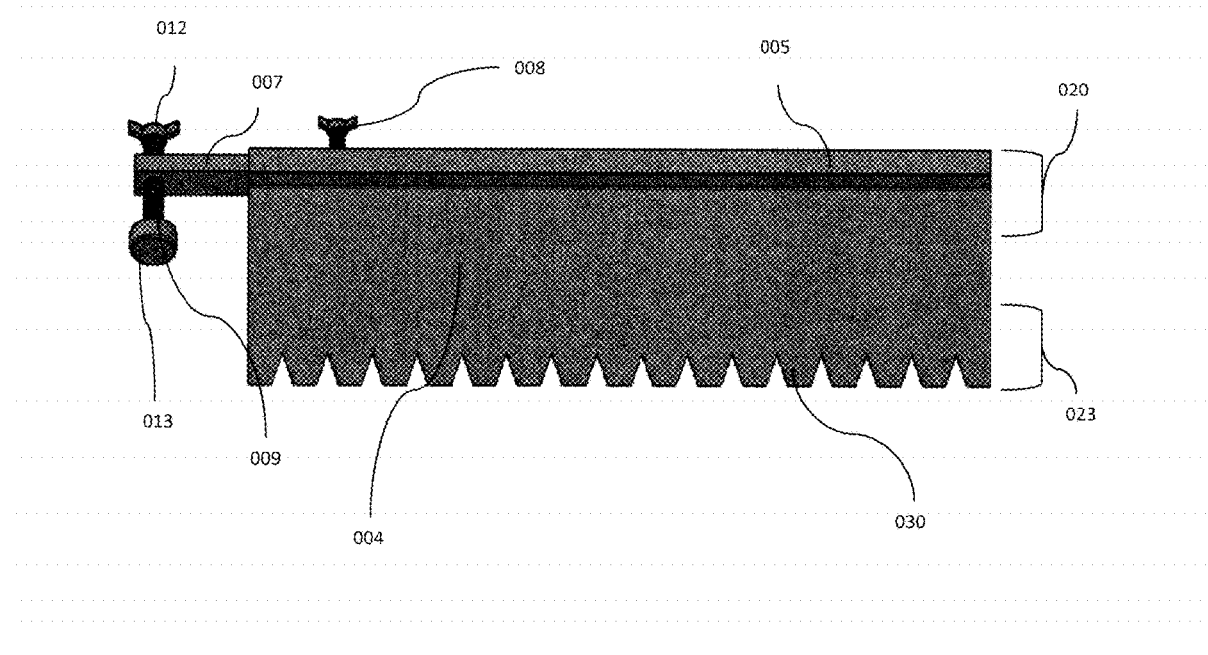
FIG. 6 illustrates a front view of the grading rake head and adjustable rake guide.

In the embodiments shown in FIGS. 1-6, an example of the AGR and all of its components as shown, the AGR is comprised of a grading rake head 001 and an elongate blade spine 006 attached to the grading rake head. The AGR user is able to grasp the grading rake head and move it in a direction specified by the AGR user. The grading rake head is comprised of an elongate blade 004 having an elongate blade top edge 020 and elongate blade bottom grading edge 023, which may accommodate blade teeth 030, and a guide track 005 mounted on the elongate blade top edge. The grading rake head may communicate with a primary surface in relation to a secondary surface, the secondary surface determined by an adjustable rake guide 002 as set by the adjustable guided rake user. An adjustable rake guide may be comprised of a guide arm 007 in sliding communication with a guide track, a fastener 008 for securing a guide arm within a guide track, and a height adjuster 009 for adjusting the height of the bottom grading edge relative to a secondary surface. The height adjuster comprises a height adjuster control 012 for raising and lowering the height adjuster, and a disk 013 configured to guide the height adjuster along a secondary surface. An adjustable rake guide may be secured to a grading rake head and adjustable to meet a different secondary surface height, and capable of communicating with a secondary surface of the same or different properties.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The scope of the claims should not be limited by the preferred embodiments set forth in the examples, but should be given the broadest interpretation consistent with the description as a whole.

I claim:

1. An adjustable guided rake apparatus for grading a material on a primary surface to a user specified standard relative to a secondary surface, the apparatus comprising:
   a grading rake head comprising an elongate blade having a top edge and a bottom grading edge;
   a guide track mounted on the top edge of the elongate blade;
   at least one adjustable rake guide slidably mounted within the guide track; and
   wherein each adjustable rake guide comprises:
      a guide arm in sliding communication with the guide track;
      at least one fastener for securing the guide arm within the guide track; and
      at least one height adjuster for adjusting the height of the bottom grading edge relative to the secondary surface, attached to the guide arm.

2. The apparatus according to claim 1, wherein the height adjuster comprises:
   a height adjuster control for raising and lowering the height adjuster; and
   a disk configured to guide the height adjuster along a secondary surface.

3. The apparatus according to claim 1, wherein the guide track forms an acute angle in relation to the grading rake head.

4. The apparatus according to claim 3, wherein the bottom grading edge of the elongate blade is curved away from the acute angle formed by the guide track in relation to the grading rake head.

5. The apparatus according to claim 1, further comprising a handle attached to the grading rake head.

6. The apparatus according to claim 1, wherein the bottom grading edge comprises a straight edge.

7. The apparatus according to claim 1, wherein the bottom grading edge comprises a plurality of blade teeth.

8. The apparatus according to claim 1, further comprising an elongate blade spine running in parallel and along the middle of the grading rake head, and protruding slightly from the grading rake head at a 90 degree angle, such that it spans the same length of the entirety of the grading rake head.

9. The elongate blade spine according to claim 8, wherein the elongate blade spine is configured to be used as a point whereby the user is able to grasp the grading rake head directly with their hand.

10. A method of grading material of a primary surface to a user specified standard using an adjustable guided rake apparatus according to claim 1, the method comprising the steps of:
- adjusting the at least one adjustable rake guide to a specified height in relation to the secondary surface;
- adjusting the at least one adjustable rake guide to a specified standard within the guide track; and
- passing the grading edge of the rake head of the adjustable guided rake apparatus over the primary surface until the specified standard is achieved.

11. The method according to claim 10, further comprising the steps of
- moving the grading rake head in a desired direction;
- passing said grading rake head over said primary surface in relation to the secondary surface while the secondary surface is in contact with the at least one adjustable rake guide;
- adjusting said at least one adjustable rake guide secured to the grading rake head to meet another secondary surface at a different height; and
- passing said grading rake head over said secondary surface in relation to the another secondary surface while the another secondary surface is in contact with the at least one adjustable rake guide, wherein the secondary surfaces have the same or different properties.

* * * * *